United States Patent
Asher

(10) Patent No.: US 7,949,825 B2
(45) Date of Patent: May 24, 2011

(54) DISK ARRAY SYNCHRONIZATION USING POWER DISTRIBUTION

(75) Inventor: Michael Asher, Green Cove Springs, FL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1078 days.

(21) Appl. No.: 11/784,830

(22) Filed: Apr. 10, 2007

(65) Prior Publication Data

US 2008/0256291 A1 Oct. 16, 2008

(51) Int. Cl.
*G06F 12/00* (2006.01)
*G11B 21/02* (2006.01)

(52) U.S. Cl. ............... 711/112; 711/114; 711/E12.001; 360/70; 360/73.02; 360/75

(58) Field of Classification Search ............ 711/112, 711/114; 360/70, 73.02, 75
See application file for complete search history.

(56) References Cited

U.S. PATENT DOCUMENTS

| | | | |
|---|---|---|---|
| 4,870,643 A * | 9/1989 | Bultman et al. ............ 714/6.32 |
| 4,907,105 A | 3/1990 | Kurzwell, Jr. | |
| 4,918,544 A | 4/1990 | Ishizuka et al. | |
| 5,159,503 A | 10/1992 | Mitamura et al. | |
| 5,216,654 A | 6/1993 | Itoh et al. | |
| 5,237,466 A | 8/1993 | Glaser et al. | |
| 5,249,254 A | 9/1993 | Murphy et al. | |
| 5,303,097 A | 4/1994 | Baba et al. | |
| 5,491,593 A | 2/1996 | Donaldson | |
| 5,796,540 A | 8/1998 | Jones et al. | |
| 5,841,604 A * | 11/1998 | Supino ................ 360/73.03 |
| 5,877,913 A * | 3/1999 | Shitara ................ 360/73.02 |
| 5,999,357 A | 12/1999 | Serrano | |
| 6,012,124 A | 1/2000 | Kamo et al. | |
| 6,118,612 A * | 9/2000 | Judd et al. ............ 360/73.03 |
| 6,134,068 A * | 10/2000 | Donaldson ............ 360/73.02 |
| 6,603,625 B1 | 8/2003 | Hospodor et al. | |
| 7,111,192 B2 | 9/2006 | Iguchi | |
| 2003/0229758 A1* | 12/2003 | Kawamoto ............ 711/114 |
| 2004/0107313 A1* | 6/2004 | Kamo et al. ............ 711/114 |
| 2005/0132154 A1* | 6/2005 | Rao et al. ............ 711/162 |

OTHER PUBLICATIONS

Reduced Cable Smart Motors Communicating Over the DC Power Bus-Line, H. Harry Asada, Principal Investigator and Eric Wade, Graduate Research Assistant, Progress Report No. 3-3, Oct. 1, 2001-Mar. 31, 2002, MIT Home Automation and Healthcare Consortium. pp. 1-19.

* cited by examiner

*Primary Examiner* — Shane M Thomas
(74) *Attorney, Agent, or Firm* — Brooks Kushman P.C.

(57) ABSTRACT

Disk drives are synchronized by a timing signal generated in a master disk drive. The timing signal is transmitted over a power distribution network common to the disk drives. A slave drive receives the timing signal and synchronizes at least one disk based on the timing signal.

20 Claims, 3 Drawing Sheets

DISK ARRAY SYNCHRONIZATION USING POWER DISTRIBUTION

BACKGROUND

1. Field of the Invention

The present invention relates to synchronizing multiple disk drives.

2. Background Art

Disk drives store data on rotating storage elements such as magnetic or optical disks. An array of disk drives may be used to increase data throughput, decrease access latency, provide fault tolerance, and the like. A common disk array system for distributing data amongst several disks is referred to as a Redundant Array of Independent Drives (RAID). In a typical RAID system, a single logical storage device is created using multiple physical devices, such as magnetic disk hard drives. There are many RAID techniques (known as "levels") with varying design goals and performance profiles. Some of the most common are RAID levels 1, 5, 10, and 0+1. In such RAID systems, a single block of data is distributed across multiple physical drives. The failure of any single disk causes no data loss due to redundant storage.

In order to increase performance, data may be written to multiple disks in different disk drives roughly simultaneously. However, as disks in different drives tend to be in different relative rotational positions, the latency before accessing data may be different for each drive. Various solutions for synchronizing the disks in different disk drives have been proposed. Typically, a master disk drive generates a synchronization signal that is distributed to the remaining slave drives. All these solutions require special wiring for distributing the synchronization signaling. This increases the cost of such systems and makes installation into existing disk arrays difficult.

SUMMARY OF THE DISCLOSURE

The present disclosure synchronizes disks in an array of disk drives by distributing a synchronization signal over the power supply wiring.

In one embodiment, A data storage includes a common power distribution network and a plurality of disk drives. Each disk drive receives power from the common power distribution network. At least one of the disk drives serves as a master disk drive and at least one of the disk drives serves as a slave drive. The master disk drive is operative to generate a synchronization signal based on a rotational position of at least one disk within the master disk drive, modulate a carrier with the synchronization signal to produce a modulated signal, and transmit the modulated signal over the common power distribution network. The slave disk drive is operative to receive the modulated signal over the common power distribution network, demodulate the received modulated signal to recover the synchronization signal, and modify a rotational position of at least one disk within the slave disk drive.

In another embodiment, a method of synchronizing a plurality of disk drives is provided. A timing pulse is generated at a master disk drive. The timing pulse is transmitted over a power distribution network common to the disk drives. The transmitted timing pulse is received from the power distribution network at a slave disk drive and at least one disk in the slave disk drive is synchronized based on the received timing pulse.

In still another embodiment, a RAID array includes a power distribution network for providing DC power. A master disk drive draws power from the power distribution network and transmits a synchronization signal over the power distribution network. At least one slave disk drive draws power from the power distribution network and receives the synchronization signal from the power distribution network. The slave disk drive synchronizes the rotation of at least one disk based on the received synchronization signal.

DETAILED DESCRIPTION OF THE PREFERRED EMBODIMENT(S)

Figure 1:
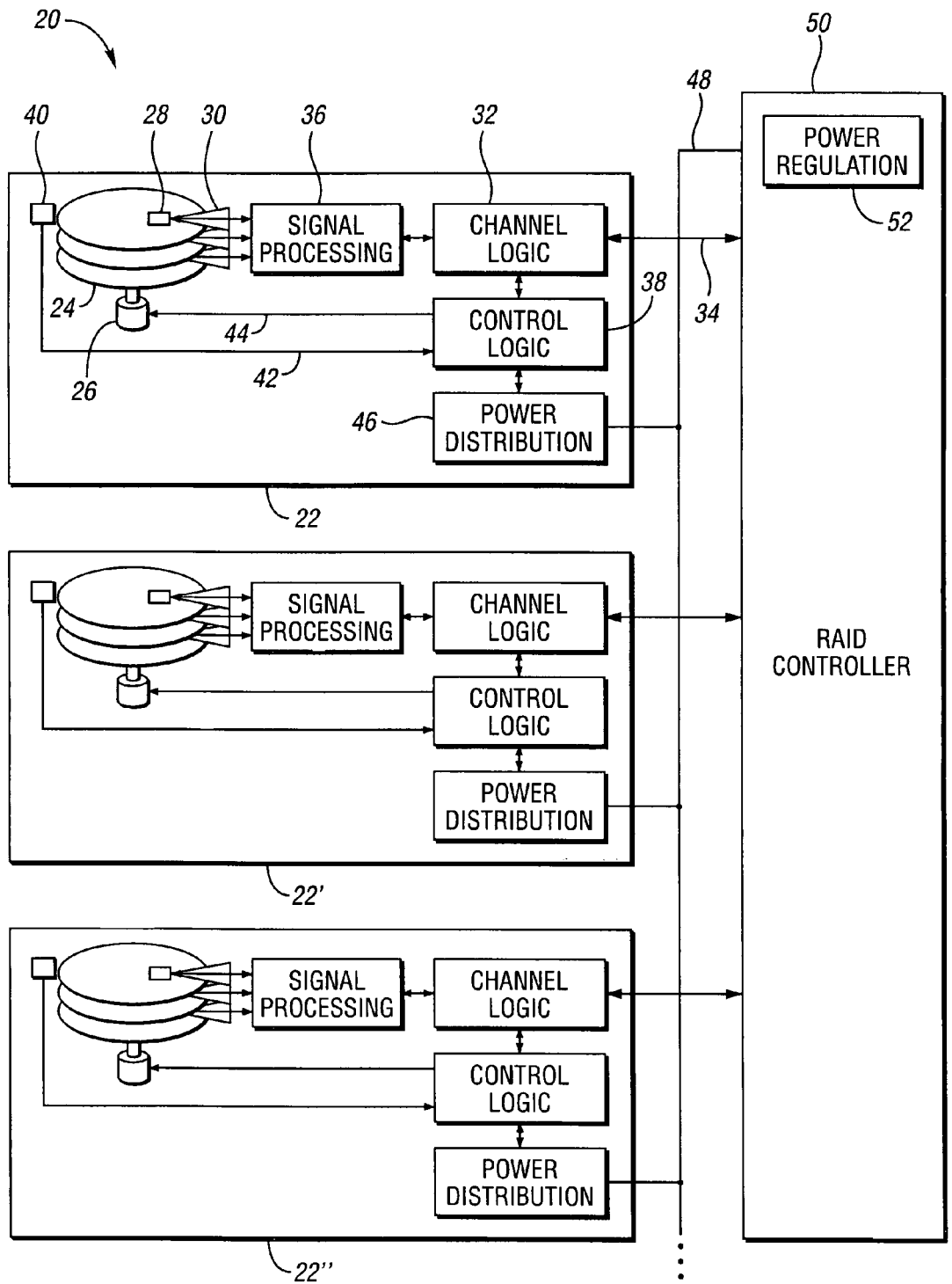
FIG. 1 is a block diagram illustrating a disk array according to an embodiment.

Referring now to FIG. 1, a block diagram illustrating a disk array according to an embodiment is shown. Disk drive 22 may conform to any standard for disk drives, including various standards for SCSI, SAS, ATA, SATA, Fibre Channel, ESCON, FICON, ESDI, IDE, and the like. A disk drive array, shown generally by 20, includes a plurality of disk drives 22. Each disk drive 22 includes one or more disks 24 rotated by motor 26. Each disk 24 is accessed by at least one read/write head 28 which is moved across disk 24 by arm 30.

During a write operation, data is received by channel logic 32 in disk drive 22 over channel interconnect 34. Channel logic 32 separates command information from data and may further process the received data for writing. This processing may include dividing the data between multiple disks 24 within drive 22, adding error correction and/or detection information, encoding, encrypting, and the like. Signal processing circuitry 36 may include circuitry for converting, filtering, pulse shaping, amplifying, and other analog processing to generate write signals for read/write head 28. A read operation basically reverses the operations performed by a write operation. Read/write head 28 generates read signals for signal processing circuitry 36 which may perform various operations including amplifying, filtering, detecting, converting, and the like, to generate a digital signal for channel logic 32. Channel logic may further processes the data, including decrypting, decoding, error correction, error detection, combining data from different disks 24, and the like. The resulting data is sent on channel interconnect 34.

Disk drive 22 includes control logic 38 which controls, among other things, the rotational speed of disks 24. Sensor 40 produces position signal 42 by sensing the rotational position of disk 24 such as, for example, by generating a once-per-rotation pulse based on measuring a magnetic, optical, or mechanical variation on disk 24. Control logic 38 uses position signal 42 to set and/or maintain the rotational speed of disks 24 by providing motor control signal 44 to motor 26. Motor speed may be controlled, for example, by a phase-locked loop in control logic 38 as is known in the art. Various other rotational position sensing techniques may be used as an alternative to, or in addition with, sensor 40, including sensing markings on disk 24 with read/write head 28, using feedback from motor 26, and the like.

Power distribution circuitry 46 receives power from power distribution network 48 and distributes power to channel logic 32, signal processing 36, control logic 38, motor 26, and other components within disk drive 22 through connections not shown for clarity. Power distribution network 48 may have a bus architecture (as shown), may have a star architecture, may be daisy chained between disk drives 22, or may have any other configuration. Cabling for power distribution network 48 may be bundled with channel interconnect 34 or may be separate from channel interconnect 34. As will be described in greater detail below, power distribution circuitry 46 is operative to send and/or receive synchronization information over power distribution network 48.

In the embodiment shown, disk drive array 20 includes RAID controller 50. RAID controller 50 sends read and write commands to disk drives 22 over channel interconnects 34. RAID controller 50 also divides blocks of data for storage on disk drives 22 and aggregates data retrieved from disk drives 22. RAID controller 50 determines which RAID level is implemented and how data is to be distributed between disk drives 22. RAID controller 50 may also include power regulation circuitry 52 for supplying power distribution network 48 with regulated power such as, for example, 5 volt DC, 12 volt DC, 24 volt DC, and the like, depending on the needs of disk drives 22.

The distributed nature of disk drive array 20 works to increase data transfer bandwidth. For example, the aggregate bandwidth of a logical array is the sum of the bandwidths of each device (minus losses due to overhead such as parity). This increase in bandwidth works to increase the performance of disk drive array 20. However, there is another factor which reduces array performance, sometimes to below that of a single drive. Every disk drive has a certain rotational latency associated with any read or write request. This latency is the time required for the platter to rotate the appropriate sector underneath the fixed read/write head. The mean latency ($L_{ROT}$) is an inverse function of the platter angular velocity (the rotational speed) as expressed in Equation (1):

$$L_{ROT} = \frac{1}{2}\frac{2\pi}{\omega} = \frac{1}{2}f^{-1} \quad (1)$$

where f is the rotational frequency of disk 24 in rev/sec. The mean rotational latency of an array, however, is higher. To read any single block, all disks 24 must reach a given point in their angular rotation. Since unsynchronized disks 24 rotate at slightly different velocities, the value of the expectation latency ($\overline{L_{ROT}}$) for n drives is the sum of a series as expressed in Equation (2):

$$\overline{L_{ROT}} = f^{-1}\sum_{k=1}^{n} 2^{-k} \quad (2)$$

The number of drives (n) in Equation (2) is the total number of drives used in a write operation. In some systems, the effective number of disk drives for a read operation does not include drives used to store parity information. To see the effect of Equation (2), consider the write latency in a disk array system with five disk drives, as expressed in Equation (3):

$$\overline{L_{ROT}} = \frac{1}{2} + \frac{1}{4} + \frac{1}{8} + \frac{1}{16} + \frac{1}{32} = 0.968\, L_{MAX} \quad (3)$$

where $L_{MAX}$ is the maximum latency for a single disk. The resulting expected latency in this example is nearly double the expected rotational latency of a single disk. This increased latency offsets the bandwidth increase of the array. In particular, a disk array which sees a high volume of very small I/O requests can expect to experience extreme performance degradation.

In one embodiment of the present disclosure, array rotation synchronization is accomplished via a clock signal sent either from a master drive (e.g., 22) in array 20. All slave devices (e.g., 22', 22") receiving the signal use it to synchronize rotation precisely. Once synchronization is complete (which should take only a few milliseconds for current 10K or 15K rpm SCSI drives), the rotational latency of the array will drop to the value of a single drive.

In one embodiment, the master drive is designated manually, such as, for example, via a jumper setting on the drive itself. In alternate embodiments, all drives are initially configured identically. When the drives are first powered on, the drives agree upon one drive to act as master. This agreement may be reached, for example, via any standard leader election distributed algorithm. In a SCSI environment, the LCR (Le Lann, Chang, Roberts) algorithm, with ring position set by SCSI ID, may be used. As will be recognized by one of ordinary skill in the art, many other implementations are equally feasible.

Once a master is established, the master drive generates a periodic clock signal, the period of which is tied to the rotational speed of the drive. In the preferred embodiment, this is done by generating one pulse per platter rotation, exactly as the read head passes over the first sector on a platter track. However, the exact timing is irrelevant, so long as the signal period corresponds to some integral fraction of the rotational speed, and that all drives agree on which sector constitutes the sector start signal. In some implementations, the signal may be derived from a clock signal already present within the design, and used to stabilize the rotational period. Such clock signals may be found, for example, in a phase-locked loop used for controlling motor speed. Other synchronization signals may also be used.

The clock signal may be encoded as a radio frequency signal (e.g., analog or digital pulse), then superimposed upon the DC power rail from the array power supply. In a typical SCSI array, either the 12 volt or the 5 volt rail may be used. As multiple drives in a RAID array typically share the same power supply, the superimposed signal will then be available for decoding by each slave drive.

Figure 2:
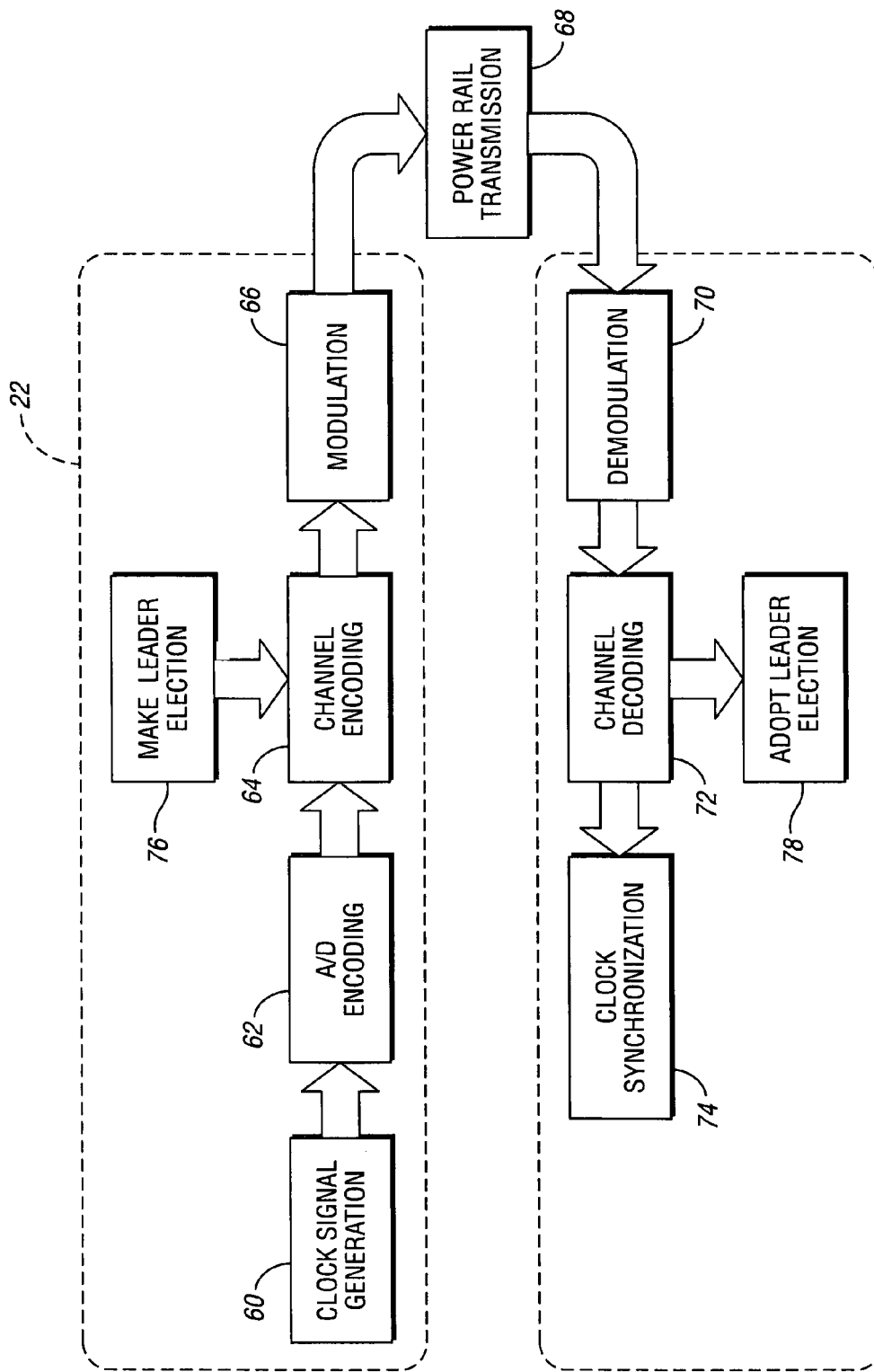
FIG. 2 is a flow diagram illustrating synchronization according to an embodiment.

Referring now to FIG. 2, a flow diagram illustrating synchronization according to an embodiment is shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form for ease of illustration.

A clock signal is generated, as in block 60. The clock signal may be generated by reading a location at a fixed point on the disk, by sensing the disk rotation, by feeding back motor information, or the like. The clock signal may also be generated as part of the speed control for the disk drive such as, for example, as part of a phase-locked loop. Optionally, this clock signal may be converted to a digital signal, as in block 62.

The clock signal is channel encoded, as in block 64. The method of encoding may depend upon the mode chosen for leader-election. If the master drive is manually configured, then little communication functionality is required, and a simple frequency-modulated RF carrier signal will suffice. If the master drive must be automatically configured, then a more complex digital encoding scheme may be used, along with a robust protocol to ensure error-free communication. In the embodiment shown, channel encoding may include the process of encoding a raw digital bit stream into a form suitable for robust communication. This may include one or more of the addition of framing or control bits, the use of redundant information to allow for error recovery, data compression, and the like.

The synchronization signal is modulated, as in block 66. Modulation may include the process of converting a bit stream to an analog RF signal capable of being transmitted through the power distribution network. This may be accomplished by the mapping of particular bit sequences to waveforms. Sample modulation schemes include QAM (quadrature amplitude modulation), OFDM (orthogonal frequency division multiplexing), FSK (frequency shift keying), and the like. The modulated synchronization signal is transmitted from master disk drive 22 to at least one slave disk drive 22' through the power system, as shown in block 68.

The synchronization signal is demodulated, as in block 70. Demodulation recovers the baseband data and/or timing information from the RF signal. Channel decoding is performed, as in block 72. Decoding is done via the corresponding inverse to the encoding process. Once the clock signal is decoded, each slave drive uses the signal to synchronize disk rotation with that of the master, as in block 74. This may be done, for example, by tuning the rotational speed via PWM (pulse width modulation), spindle motor driving voltage variance, or other well-known technique, until the received clock pulses synchronizes exactly with the start sector of each rotational period. For maximum accuracy, synchronization should account for any latency in the encoding/decoding process. For example, a 15K RPM drive completes one rotation each 66 µs (microseconds). If encoding/decoding latency averages 6 µs, then slave drives should defer synchronization lock for an additional platter rotation of $2\pi/11$ radians.

The various embodiments disclosed provide increases in performance even if some, but not all, of the disk drives in the array implement the present invention. The present invention is applicable to read and write performance for RAID levels 5, 6, 0+1, 10, and for write performance for RAID level 1. This technique may provide substantial gains with only minor modifications to existing drives, and no modifications to RAID controllers, enclosures, cabling and/or software.

In addition to synchronization signaling, information for establishing which disk drive will function as master and which drive(s) will function as slave(s) may be transmitted through the power distribution network. For example, master disk drive 76 may make the leader election, as in block 76. This election may be based on a manual setting, such as a jumper, or may be made automatically by disk drives 22, 22'. The election decision is encoded, as in block 64, modulated, as in block 66, and transmitted over a power rail, as in block 68. Slave disk drive 22' receives the transmitted decision, demodulates the decision, as in block 70, decodes the decision, as in block 72, and adopts the decision, as in block 78. In embodiments where multiple disk drives participate in making the leader election, these disk drives will have functionality to encode and decode as well as to modulate and demodulate.

Figure 3:
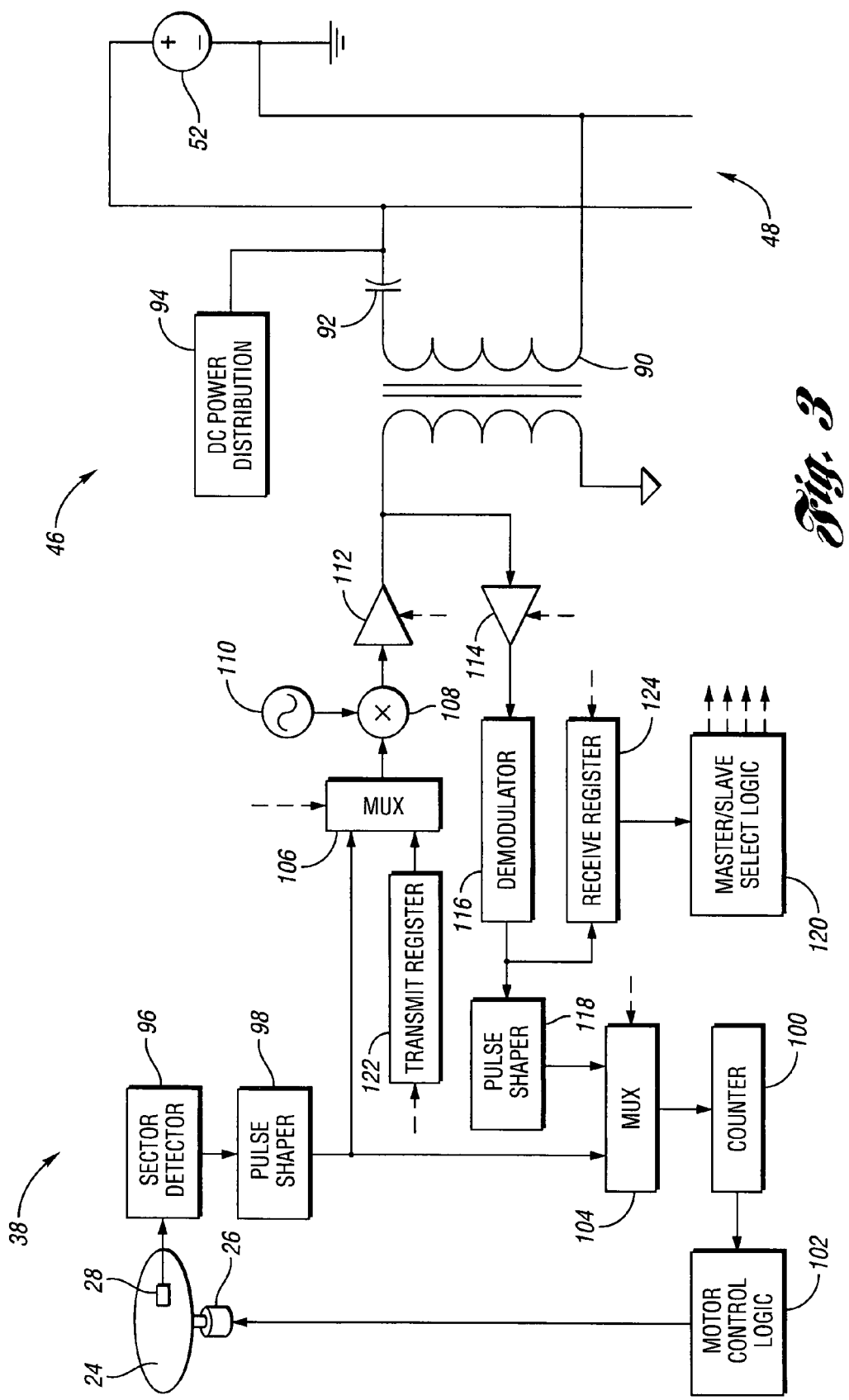
FIG. 3 is a schematic diagram illustrating power distribution circuitry and control logic according to an embodiment.

Referring now to FIG. 3, a conceptualized schematic diagram illustrating power distribution circuitry and control logic according to an embodiment is shown. DC power circuitry 52 supplies power to power distribution network 48. Power distribution circuitry 46 in disk drive 22 includes transformer 90 coupled to power distribution network 48 through DC blocking capacitor 92. DC power distribution circuitry 94 connects to power distribution network 48 before blocking capacitor 92 and distributes DC power to disk drive 22.

During operation of disk drive 22, read/write head 28 reads magnetic markings on disk 24. Sector detector logic 96 detects when read/write head 28 accesses a particular portion of disk 24 such as, for example, at the start of a particular sector on each track of disk 24. Pulse shaper 98 generates a pulse of a particular width when triggered by the output of sector detector 96. The pulse generated by pulse shaper 98 can be used to trigger one or more functions of counter 100 such as, for example, to load a value, reset, begin counting clock pulses, stop counting clock pulses, and the like. Counter 100 is used by motor control logic 102 to control the speed of motor 26 spinning disk 24. Various motor control algorithms and techniques are known in the art, and any of these techniques may be used. For example, the value in counter 100 at a particular instant of time may be used to set the width of a pulse provided to motor 26 for pulse width modulation control.

If disk drive 22 is set to function as a master disk drive, multiplexer 104 routes the output of pulse shaper 98 to counter 100 and multiplexer 106 routes the output of pulse shaper 98 to modulator 108, represented as a multiplication process multiplying the generated pulse by a high frequency carrier generated by oscillator 110. Transmit amplifier 112 amplifies the modulated signal for transformer 90, which couples the modulated signal onto power distribution network 48.

If disk drive 22 is set to function as a slave disk drive, receive amplifier 114 amplifies a modulated signal received from power distribution network through transformer 90. Demodulator 116 demodulates the received signal. Pulse shaper 118 uses the demodulated signal to generate a pulse which is routed through multiplexer 104 for controlling counter 100.

Master/slave select logic 120 generates control signals (shown as dashed lines) for determining whether disk drive 22 will function as a master disk drive or a slave disk drive. These control signals provide select functions for multiplexers 104, 106 and provide enabling signals for amplifiers 112, 114. If disk drive 22 participates in automatically determining master/slave status, master/slave select logic 120 also interfaces with transmit register 122 and receive register 124. Messages from other disk drives are received through transformer 20 and amplifier 114, are demodulated by demodulator 116, and shifted bitwise into receive register 124 where the data is used by master/slave select logic 120. When it is time for disk drive 22 to transmit, master/slave select logic 120 loads transmit register 122 with data (through a connection not shown for clarity). The data is then shifted bitwise through multiplexer 106, modulated by modulator 108, amplified by amplifier 112, and coupled onto power distribution network 48 through transformer 90.

If disk drive 22 is manually configured as either a master disk drive or a slave disk drive, multiplexer 106, transmit register 122, and receive register 124 may not be needed. In this case, master/slave select logic reads the state of a jumper (not shown for clarity) to determine whether or not disk drive 22 will function as a master disk drive or a slave disk drive, and generates control signals appropriately.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. The Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A data storage system comprising:
   a common power supply having a cabling; and
   a plurality of disk drives, each disk drive in the plurality of disk drives receiving power from the common power supply via the cabling, at least one of the plurality of disk drives serving as a master disk drive and at least one of the plurality of disk drives serving as a slave disk drive;
   wherein the at least one master disk drive is operative to generate a synchronization signal based on a rotational position of at least one disk within the at least one master disk drive, modulate a carrier with the synchronization signal to produce a modulated signal, and transmit the modulated signal to the cabling of the common power supply; and
   wherein the at least one slave disk drive is operative to receive the modulated signal from the cabling of the common power supply, demodulate the received modulated signal to recover the synchronization signal, and modify a rotational position of at least one disk within the at least one slave disk drive based on the recovered synchronization signal.

2. The data storage system of claim 1 wherein more than one of the plurality of disk drives is operative to function as the at least one master disk drive.

3. The data storage system of claim 2 wherein one master disk drive is selected by manually configuring one of the plurality of disk drives operative to function as a sole master disk drive.

4. The data storage system of claim 2 wherein the more than one of the plurality of disk drives operative to function as the at least one master disk drive automatically select one disk drive to function as a sole master disk drive.

5. The data storage system of claim 4 wherein the sole master disk drive is selected using a distributed leader election algorithm.

6. The data storage system of claim 1 wherein the plurality of disk drives form a RAID array.

7. The data storage system of claim 1 wherein at least one of the plurality of disk drives does not serve as the master disk drive and does not serve as at least one of the slave disk drives.

8. The data storage system of claim 1 wherein each disk drive in the plurality of disk drives is operative to receive from the common power supply via the cabling information for establishing which of the plurality of disk drives will serve as the at least one master disk drive and which of the plurality of disk drives will serve as the at least one slave disk drive.

9. A method of synchronizing a plurality of disk drives, the method comprising:
   receiving power from a power supply at each disk drive in the plurality of disk drives via a cabling of the power supply individually connected to each disk drive in the plurality of disk drives;
   generating a timing pulse at a master disk drive in the plurality of disk drives;
   transmitting the timing pulse over a from the master disk drive to the cabling;
   receiving the transmitted timing pulse at a slave disk drive in the plurality of disk drives via the cabling; and
   synchronizing at least one disk in the slave disk drive based on the received timing pulse.

10. The method of synchronizing a plurality of disk drives as in claim 9 wherein more than one of the plurality of disk drives is operative to function as the master disk drive.

11. The method of synchronizing a plurality of disk drives as in claim 10 wherein one of the plurality of disk drives operative to function as the master disk drive is manually set to function as the master disk drive.

12. The method of synchronizing a plurality of disk drives as in claim 10 wherein the plurality of disk drives operative to function as the master disk drive automatically determine which will function as the master disk drive.

13. The method of synchronizing a plurality of disk drives as in claim 12 wherein the master disk drive is determined using a distributed leader election algorithm.

14. The method of synchronizing a plurality of disk drives as in claim 9 further comprising forming a RAID array with the plurality of disk drives.

15. The method of synchronizing a plurality of disk drives as in claim 9 further comprising receiving from the power supply at each of the plurality of disk drives via the cabling information for establishing which of the plurality of disk drives is the master disk drive and which of the plurality of disk drives is the slave disk drive.

16. A RAID array comprising:
   a power rail;
   a master disk drive connected to the power rail and configured to draw power from the power rail and to transmit a synchronization signal over the power rail; and
   at least one slave disk drive connected to the power rail and configured to draw power from the power rail, receive the synchronization signal from the power rail, and synchronize the rotation of at least one disk in the at least one slave disk drive based on the received synchronization signal.

17. The RAID array of claim 16 wherein the master disk drive is determined by manually configuring one of a plurality of disk drives in the RAID array.

18. The RAID array of claim 16 wherein the master disk drive is determined by negotiation amongst a plurality of disk drives in the RAID array.

19. The RAID array of claim 18 wherein the negotiation comprises a distributed leader election algorithm.

20. The RAID array of claim 16 wherein the master disk drive and the at least one slave disk drive receive from the power rail information for establishing the master disk drive as a master disk drive and information for establishing each of the at least one slave disk drive as a slave disk drive.

* * * * *